(12) United States Patent
Imanari et al.

(10) Patent No.: US 7,011,770 B2
(45) Date of Patent: Mar. 14, 2006

(54) METHOD FOR PRODUCING PHOSPHOR HAVING A HIGH BRIGHTNESS

(75) Inventors: Yuichiro Imanari, Tsukuba (JP); Susumu Miyazaki, Kitasoma-gun (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/805,294

(22) Filed: Mar. 22, 2004

(65) Prior Publication Data

US 2004/0238792 A1     Dec. 2, 2004

(30) Foreign Application Priority Data

Mar. 24, 2003 (JP) ............................ 2003-079862

(51) Int. Cl.
    *C09K 11/59*    (2006.01)
(52) U.S. Cl. ................. 252/301.4 F; 252/301.6 F
(58) Field of Classification Search ......... 252/301.4 F, 252/301.6 F
    See application file for complete search history.

(56) References Cited

U.S. PATENT DOCUMENTS

| 4,208,448 | A  | * | 6/1980  | Panaccione | ................... 427/67 |
|-----------|----|---|---------|------------|----------------------------|
| 5,472,636 | A  | * | 12/1995 | Forster et al. | ........ 252/301.4 F |
| 5,839,718 | A  | * | 11/1998 | Hase et al. | ........... 252/301.4 F |
| 6,802,990 | B1 | * | 10/2004 | Toda et al. | ........... 252/301.4 F |
| 6,884,367 | B1 |   | 4/2005  | Ono et al. |                           |
| 2002/0153510 | A1 | * | 10/2002 | Sun et al. | ............. 252/301.4 P |

FOREIGN PATENT DOCUMENTS

| JP | 05-255665  | 10/1993 |
| JP | 05 295364  | 11/1993 |
| JP | 2000-230173 | 8/2000 |

\* cited by examiner

*Primary Examiner*—C. Melissa Koslow
(74) *Attorney, Agent, or Firm*—Sughrue Mion, PLLC

(57) ABSTRACT

A method for producing a phosphor having a high brightness is described. The method for producing a phosphor having a high brightness, comprises steps of:
  contacting a luminescent material containing Si and/or Ge with an acid,
  separating solid from the acid, and
  drying an obtained solid.

6 Claims, No Drawings

METHOD FOR PRODUCING PHOSPHOR HAVING A HIGH BRIGHTNESS

BACKGROUND OF THE INVENTION

1. Field of the Invention

The present invention relates to a method for producing a phosphor having a high brightness.

2. Description of Related Art

Phosphor are used in vacuum ultraviolet ray-excited light-emitting elements such as plasma display panels (hereinafter, referred to as "PDP") and rare gas lamps, electron beam excited light-emitting elements such as CRT, ultraviolet ray-excited light-emitting elements such as tricolor fluorescent lamp, X-ray excited light-emitting elements such as X-ray image apparatus.

For example, an aluminate phosphor $BaMgAl_{10}O_{17}$:Eu as a blue-emitting phosphor, a silicate phosphor $Zn_2SiO_4$:Mn as a green-emitting phosphor and a borate phosphor (Y, Gd)$BO_3$:Eu as a red-emitting phosphor have conventionally been practically used, and these phosphors are used as vacuum ultraviolet ray-excited light-emitting elements such as PDP, rare gas lamps. These phosphors are produced by a method of calcining a mixture of compounds containing metal elements or boron.

Phosphor is required to have a high brightness, and JP-A No. 2000-230173 disclosed that phosphor such as $BaMgAl_{10}O_{17}$:Eu, $Zn_2SiO_4$:Mn and (Y, Gd)$BO_3$:Eu is obtained by a method in which, a mixture of compounds contains metal elements to obtain the phosphor is calcined, ground and classified or sieved.

SUMMARY OF THE INVENTION

An object of the present invention is to provide a method for producing a phosphor having a high brightness.

The present inventors have intensively studied, and resultantly completed the present invention.

Namely, the present invention provides a method for producing a phosphor having a high brightness, comprising steps of:

contacting a luminescent material containing Si and/or Ge with an acid,

Separating a solid from an acid, and drying an obtained solid.

DETAILED DESCRIPTION OF THE PREFERRED EMBODIMENTS

The present invention will be illustrated in detail below. In the method of the present invention, a luminescent material containing Si and/or Ge ("Si and/or Ge" means Si, Ge or both of Si and Ge.) is used as a raw material.

Preferable example includes a luminescent material comprises the following components (I) and (II).

(I) a compound comprising at least one selected from the group consisting of Ca, Sr and Ba, at least one selected from the group consisting of Mg and Zn and at least one selected from the group consisting of Si and Ge, (II) at least one selected from the group consisting of Eu and Mn as an activator.

Further preferable example includes a luminescent material comprises a compound represented by the formula $mM^1O.nM^2O.2M^3O_2$ (wherein, $M^1$ represents at least one selected from the group consisting of Ca, Sr and Ba; $M^2$ represents at least one selected from the group consisting of Mg and Zn; $M^3$ represents at least one selected from the group consisting of Si and Ge; m is from 0.5 to 3.5; n is from 0.5 to 2.5.) and at least one selected from the group consisting of Eu and Mn as an activator.

The above-described luminescent material may be prepared by a method of calcining a metal compound mixture (that becomes the luminescent material by calcination). The luminescent material may be usually prepared by weighing compounds containing Si and/or Ge, and optionally compounds containing Ca, Sr, Ba, Mg, Zn, Eu or Mn at a given ratio, mixing them, and the calcining the mixture under an air, inert gas atmosphere such as Ar, $N_2$, or a reducing atmosphere such as $H_2$.

For example, a luminescent material comprises a compound represented by the formula $Ca_{1-x-y}Sr_xEu_yMgSi_2O_6$ (wherein, x is 0 or more and 0.5 or less; y is 0.001 or more and 0.1 or less.), which is one of preferable luminescent materials, may be prepared by weighing $CaCO_3$, $SrCO_3$, $Eu_2O_3$, $(MgCO_3)_4Mg(OH)_2.5H_2O$ and $SiO_2$ at a molar ratio of Ca:Sr:Eu:Mg:Si of 1-x-y:x:y:1:2, mixing them, and then calcining the mixture under a reducing atmosphere.

In case of $Ca_{0.9215}Sr_{0.0485}Eu_{0.03}MgSi_2O_6$, this luminescent materials may be prepared by weighing $CaCO_3$, $SrCO_3$, $Eu_2O_3$, $(MgCO_3)_4Mg(OH)_2.5H_2O$ and $SiO_2$ at a molar ratio of Ca:Sr:Eu:Mg:Si of 0.9215:0.0485:0.03:1:2, mixing them, and then calcining the mixture under a reducing atmosphere.

Further, in the method of the present invention, commercially available luminescent materials containing Si and/or Ge having or recycled luminescent materials having lowered brightness may be used as a raw material.

In the method of the present invention, a luminescent material is preferably ground by using a pulverizer such as a ball mill, vibration mill, roll mill, jet mill to obtain a powdery luminescent material. For controlling a specific surface area of the powdery luminescent material, the powdery may be classified by using a wet classifier such as a settler, hydro cyclone, centrifuge; a dry classifier such as a cyclone, air separator, turbo classifier (trade name: manufactured by Nisshin Flour Milling Inc.).

The luminescent material is allowed to contact with an acid. The acid includes organic acids such as acetic acid, oxalic acid; inorganic acids such as hydrochloric acid, nitric acid, sulfuric acid. The acid is preferably a solution, hydrochloric acid, nitric acid and sulfuric acid are more preferable, and hydrochloric acid is further preferable.

The water solution of acid has preferably hydrogen ion concentration of 0.001 mol/liter or more, more preferably hydrogen ion concentration of 0.01 mol/liter or more and 5 mol/liter or less, further preferably hydrogen ion concentration of 0.1 mol/liter or more and 2 mol/liter or less. The amount of aqueous solution of the acid is usually 150 parts by weight or more and 20000 parts by weight or less, preferably 250 parts by weight or more and 10000 parts by weight or less, further preferably 400 parts by weight or more and 2000 parts by weight or less per 100 parts by weight of a luminescent material.

The method of contacting a luminescent material with an acid includes, for example, a method of adding a luminescent material to an acid having given hydrogen ion concentration, a method of mixing a luminescent material with an acid in a wet process by using a ball mill, or a method of adding a luminescent material to an acid and stirring the obtained mixture. Among these methods, a method of adding a luminescent material to an acid and stirring the obtained mixture is preferable.

Contacting the luminescent material with an acid may be conducted in a room temperature (around 25° C.), preferably about 30 to 80° C. Contacting the luminescent material with an acid may be conducted for about 10 minutes to 10 hours.

After contacting a luminescent material with an acid, the solid is separated from the acid. Separation may usually be conducted by a filtration, pressure-reduced filtration, pressure filtration, centrifugation, decantation and the like.

The obtained solid is dried. Drying may be usually conducted by using a vacuum drier, hot air heat drier, conical drier, rotary evaporator and the like. Drying may be conducted at temperatures of 60° C. or more, preferably 90° C. or more and 700° C. or less, further preferably 100° C. or more and 200° C. or less. Drying is conducted usually in air or inert gas (nitrogen gas, argon gas and the like). Further, a dried solid may be further ground or classified.

By subjecting a luminescent material contacted with an acid having given hydrogen ion concentration to separation to take out a solid that is then dried, a phosphor having a high brightness is obtained. The phosphor emits lights at high brightness upon excitation with vacuum ultraviolet ray, ultraviolet ray, X-ray, electron beam or the like.

EXAMPLES

The present invention will be illustrated in detail by the following examples, but the scope of the invention is not limited to these examples.

For measurement of light emission brightness, a phosphor is placed in a vacuum chamber, maintained under a vacuum of 6.7 Pa ($5 \times 10^{-2}$ torr) or less, and excited under radiation of vacuum ultraviolet ray using an excimer 146 nm lamp (type H0012, manufactured by Ushio Inc.) to cause light emission.

Example 1

In producing a luminescent material composed of a compound expressed by the formula $Ca_{0.9215}Sr_{0.0485}Eu_{0.03}MgSi_2O_6$, calcium carbonate ($CaCO_3$, manufactured by Ube Materials Industries, Ltd., purity: 99.9%), strontium carbonate ($SrCO_3$, manufactured by Sakai Chemical Industry Co., Ltd, purity: 99.9%), basic magnesium carbonate (($MgCO_3)_4Mg(OH)_2.5H_2O$, manufactured by Kyowa Kagaku Kogyo K.K., purity: 99.9% or over), silicon dioxide ($SiO_2$, manufactured by Nippon Aerosil Kogyo K.K., purity: 99.9%) and europium oxide ($Eu_2O_3$, manufactured by Shin-Etsu Chemical Co., Ltd., purity: 99.9%) were weighed at a molar ratio of Ca:Sr:Mg:Si:Eu of 0.9215:0.0485:1.0:2.0:0.03, and mixed in the presence of isopropyl alcohol for 4 hours by using a ball mill in a wet process. The isopropyl alcohol was removed from the mixture by using an evaporator, the obtained solid was dried, charged into an alumina crucible and calcined under conditions of a temperature of 1200° C., a time of 2 hours and an a reducing atmosphere composed of a mixed gas (hydrogen: 2 vol %, nitrogen: balance), cooled to room temperature, then, ground by using a jet mill in a pressure of 1 kgf/cm² to obtain a luminescent material.

5.0 g of the luminescent material was added to 100 g of hydrochloric acid having a hydrogen ion concentration of 1 mol/liter at temperature of 24° C., stirred for 3 hours by using a magnetic stirrer. A solid was separated from the mixture slurry by suction filtration, then, dried under conditions of a pressure of 1.0 kPa and a temperature: 100° C.

The obtained phosphor emitted blue light having relative brightness of 118 when the brightness of the luminescent material before contact with the acid was 100.

Example 2

The same procedure as in Example 1 was conducted except that the hydrogen ion concentration of hydrochloric acid to be contacted was changed to 0.1 mol/l. The phosphor obtained in this example had relative brightness of 110.

Example 3

The same procedure as in Example 1 was conducted except that the hydrogen ion concentration of hydrochloric acid to be contacted was changed to 0.01 mol/l. The phosphor obtained in this example had relative brightness of 102.

Comparative Example 1

The same procedure as in Example 1 was conducted except that the solution to be contacted was changed to water having a hydrogen ion concentration of $10^{-7}$ mol/l (pH=7). The phosphor obtained in this example had relative brightness of 100.

What is claimed is:

1. A method for producing a phosphor having a high brightness, comprising steps of:
   contacting a luminescent material containing Si and/or Ge with an acid,
   separating solid from the acid, and
   drying an obtained solid
   wherein:
   the luminescent material comprises the components (I) and (II),
   (I) a compound comprising at least one selected from the group consisting of Ca, Sr and Ba, at least one selected from the group consisting of Mg and Zn and at least one selected from the group consisting of Si and Ge,
   (II) at least one selected from the group consisting of Eu and Mn as an activator; and
   the acid is a solution having a hydrogen ion concentration of 0.001 mol/l or more.

2. The method according to claims 1, wherein the luminescent material comprises a compound represented by the formula $mM^1O.nM^2O.2M^3O_2$ (wherein, $M^1$ represents at least one selected from the group consisting of Ca, Sr and Ba; $M^2$ represents at least one selected from the group consisting of Mg and Zn; $M^3$ represents at least one selected from the group consisting of Si and Ge; m is from 0.5 to 3.5; n is from 0.5 to 2.5.) and at least one selected from the group consisting of Eu and Mn as an activator.

3. The method according to claims 1, wherein the acid is at least one selected from the group consisting of organic acid and inorganic acid.

4. The method according to claims 3, wherein the inorganic acid is at least one selected from the group consisting of hydrochloric acid, nitric acid and sulfuric acid.

5. The method according to claims 4, wherein the inorganic acid is hydrochloric acid.

6. The method according to claims 1, wherein the phosphor is a phosphor for a vacuum ultraviolet ray-excited light-emitting element.

* * * * *